United States Patent [19]

Ohara et al.

[11] Patent Number: 4,858,019
[45] Date of Patent: Aug. 15, 1989

[54] LIGHT SCANNING RECORDING DEVICE

[75] Inventors: Yuji Ohara; Hideo Watanabe, both of Kanagawa, Japan

[73] Assignee: Fuji Photo Film Co., Ltd., Kanagawa, Japan

[21] Appl. No.: 229,417

[22] Filed: Aug. 8, 1988

[30] Foreign Application Priority Data

Aug. 7, 1987 [JP] Japan ................... 62-197733

[51] Int. Cl.⁴ ................... H04N 1/04; H04N 1/12
[52] U.S. Cl. ................... 358/474; 358/296; 358/412; 358/494; 271/265
[58] Field of Search ............... 358/285, 293, 256, 267, 358/296, 294; 382/58, 66; 271/265, 270

[56] References Cited

U.S. PATENT DOCUMENTS 4,356,516 10/1982 Koguchi ................... 358/267
4,566,043 12/1986 Tamura ................... 358/300
4,566,903 12/1985 Blitchington et al. ................... 358/294

FOREIGN PATENT DOCUMENTS 0025475 2/1984 Japan .

Primary Examiner—James J. Groody
Assistant Examiner—Kim Y. Vu
Attorney, Agent, or Firm—Sughrue, Mion, Zinn, Macpeak & Seas

[57] ABSTRACT

A modulated light beam is deflected by a light deflector to scan a recording medium in a main scanning direction while the recording medium is being fed through a feed path in an auxiliary scanning direction. The light beam is applied during intervals before and after the recording medium is scanned by the modulated light beam. The light beam deflected during the intervals is detected across the feed path by a light detector. A scanning period in which the recording medium is scanned by the modulated light beam is detected based on a change in an output signal from the light detector due to the presence of the recording medium in the feed path between the light detector and the light deflector. The speed of feed of the recording medium in the auxiliary scanning direction by counting pulses of a reference clock signal during the detected scanning period.

3 Claims, 2 Drawing Sheets

LIGHT SCANNING RECORDING DEVICE

BACKGROUND OF THE INVENTION

1. Field of the Invention

The present invention relates to a light scanning recording device for scanning a recording material with a light beam modulated with an image signal to record an image on the recording medium, and more particularly to a light scanning recording device having means for monitoring an auxiliary scanning speed.

2. Description of the Prior Art

There have heretofore been proposed various light scanning recording devices which operate by modulating a light beam with an image signal, deflecting the modulated light beam with a light deflector to scan a recording medium with the deflected light beam in a main scanning direction, and feeding the medium in a direction substantially normal to the main scanning direction thereby to record a two-dimensional image represented by the image signal on the recording medium.

In the light scanning recording devices of this type, the auxiliary scanning speed at which the recording medium is fed may be varied for some reasons. When the auxiliary scanning speed is varied, the length of a recorded image in the auxiliary scanning speed may become incorrect or the time required to record one image on the recording medium may be altered.

SUMMARY OF THE INVENTION

In view of the aforesaid drawbacks of the conventional light scanning recording devices, it is an object of the present invention to provide a light scanning recording device which has means for monitoring an auxiliary scanning speed to control the auxiliary scanning speed at a constant level.

According to the present invention, there is provided a light scanning recording device for recording an image on a recording medium, comprising: a light source for emitting a light beam modulated by an image signal representing the image; a light deflector for deflecting the modulated light beam to scan the recording medium in a main scanning direction; feed means for feeding the recording medium through a feed path in an auxiliary scanning direction transverse to the main scanning direction to record the image two-dimensionally on the recording medium; control means for controlling the light source and the light deflector to deflect the light beam during intervals before and after the recording medium is scanned by the modulated light beam; a light detector for detecting the light beam deflected during the intervals across the feed path; scanning period detecting means for detecting a scanning period in which the recording medium is scanned by the modulated light beam, based on a change in an output signal from the light detector due to the presence of the recording medium in the feed path between the light detector and the light deflector; and auxiliary scanning speed measuring means for measuring the speed at which the recording medium is fed through the feed path in the auxiliary scanning direction by counting pulses of a reference clock signal during the scanning period which is detected by the scanning period detecting means.

Since the number of pulses of the reference clock signal which are counted in the scanning period is proportional to the length of the scanning period, it is in inverse proportion to the auxiliary scanning speed. Therefore, the auxiliary scanning speed can be determined based on the pulse count. A signal indicative of the auxiliary scanning speed thus determined may be fed back to the feed means to control the speed of feed of the recording medium at a constant level. Alternatively, the auxiliary scanning speed may be displayed so that any deviation thereof from a prescribed speed can manually be eliminated by the operator.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
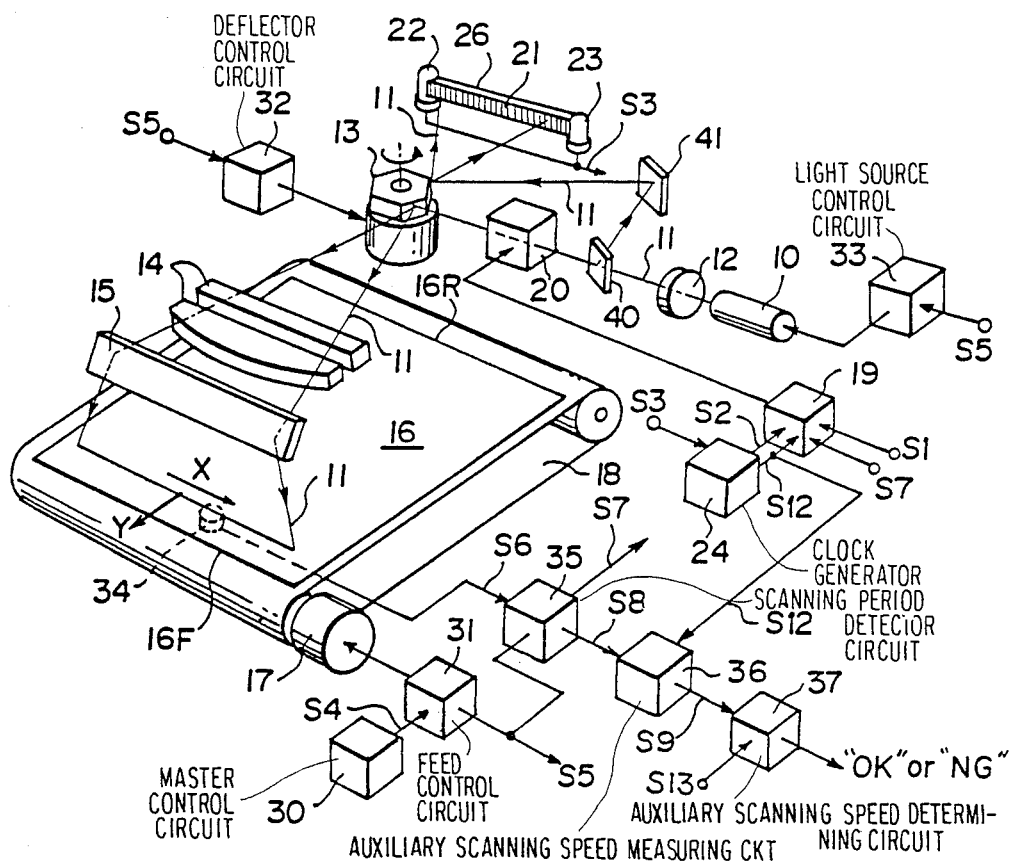
FIG. 1 is a schematic perspective view of a light scanning recording device according to a first embodiment of the present invention.

As shown in FIG. 1, a light scanning recording device according to a first embodiment of the present invention has a light source 10 such as a semiconductor laser, an He-Ne laser, or the like for emitting a light beam 11. The emitted laser beam 11 is converted by a collimator lens 12 into a parallel-ray light beam which is passed through a half-silvered mirror 40 and then through a light modulator 20 (described later), and applied to a rotating polygon 13. The light beam 11 is then reflected and deflected by the polygon 13 to travel through a condenser lens 14 which usually in the form of an f·θ lens. The light beam 11 is thereafter reflected by an elongate mirror 15 to scan a photosensitive film 16 in a main scanning direction indicated by the arrow X. At the same time, the photosensitive film 16 is fed in an auxiliary scanning direction indicated by the arrow Y which is substantially normal to the main scanning direction X, by a transparent endless belt 18 which is driven by an actuator 17. Therefore, the light beam 11 is two-dimensionally applied to the photosensitive film 16.

The light beam 11 is modulated by the light modulator 20 which may be an AOM (acousto-optic modulator) which is controlled by a modulating circuit 19 based on an image by the image signal S1 is recorded on the photosensitive film 16 upon application of the modulated light beam 11. The beam modulating timing in the light modulator 20 is strictly controlled by a pixel clock signal S2 and a line clock signal S12 which are generated as described below and applied to the modulating circuit 19.

The pixel clock signal S2 and the line clock signal S12 are generated as follows: The light beam 11 reflected by the half-silvered mirror 40 is reflected by a mirror 41 to fall on the polygon 13 which reflects and deflects the light beam 11 to scan a known grid 21. The grid 21 comprises a linear array of alternate areas or zones of larger and smaller transmittances on an elongate light guide 26. The grid 21 is scanned in synchronism with the scanning of the photosensitive film 16 in the main scanning direction X. The light beam 11 that has passed through the grid 21 to the light guide 26 is detected by light detectors 22, 23 disposed on the opposite ends of the light guide 26. Since the grid 21 has alternate areas of larger and smaller transmittances, the level of an output signal Se from the light detectors 22, 23 cyclically varies as the light beam 11 scans the grid 21. The output signal S3 is applied to a clock generator 24 to produce a pulsed pixel clock signal S2 which has a rising edge for each of pixels to be established on the photosensitive film 16 along the main scanning direction X. The clock generator 24 also produces a line clock signal S12 which indicates switching from one main scanning line to a next main scanning line each time a predetermined number of pulses of the pixel clock signal S2 are counted.

The speed of movement of the endless belt 18 for feeding the photosensitive film 16 in the auxiliary scanning direction Y may be varied for various reasons, e.g., due to a variation in the speed of operation of the actuator 17. When the speed of feed of the photosensitive film 16 is varied, the length of a recorded image on the photosensitive film 16 in the auxiliary scanning direction Y may become incorrect or the time required to record one image on the photosensitive film 16 may be altered.

Figure 2:
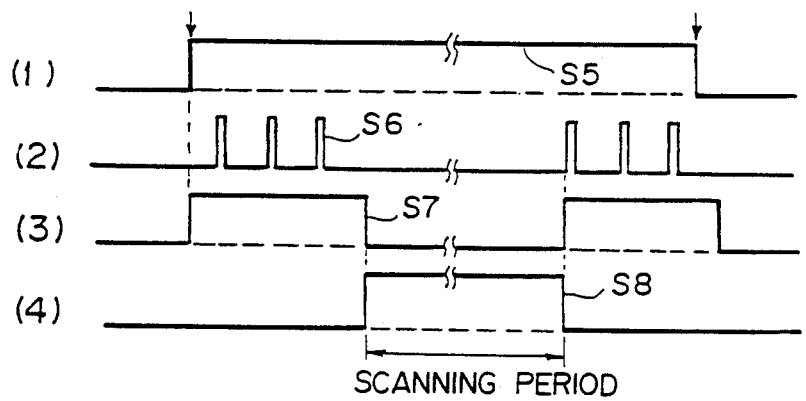
FIG. 2 is a diagram showing the waveforms of signals in the light scanning recording device shown in FIG. 1.

This problem can be prevented from occurring according to the present invention as follows: The ight scanning recording device is controlled in its operation by a master control circuit 30. When a command for recording an image is applied to the master control circuit 30, it applies a drive command signal S4 to a feed control circuit 31 for controlling operation of the actuator 17. In response to the drive command signal S4, the feed control circuit 31 energizes the actuator 17 to actuate the endless belt 18. When the photosensitive film 16 is fed a prescribed distance by the endless belt 18, a beam command signal S5 is issued by the feed control circuit 31 to a deflector control circuit 32. The waveform of the beam command signal S5 is shown in FIG. 2 at (1). In response to the beam command signal S5, the deflector control circuit 32 operates the light deflector 13. The prescribed distance by which the photosensitive film 16 is fed before the beam command signal S5 is generated is selected to be shorter than a distance which is to be traversed by the leading end 16F of the photosensitive film 16 to reach a position where the light beam 11 will be applied to the film 16. The light source 10 is energized when the beam command signal S5 is applied to a light source control circuit 33. Therefore, the light beam 11 directly scans the endless belt 18 in several main scanning cycles prior to application of the light beam 11 to the photosensitive film 16.

A light detector 34 such as a photodiode or the like is disposed within the transparent endless belt 18 for detecting the light beam 11 that has passed through the endless belt 18. The light detector 34 detects the light beam 11 several times which scans the endless belt 18 before the light beam 11 scans the photosensitive film 16. When the photosensitive film 16 is further fed by the endless belt 18 to the position where the photosensitive film 16 is then scanned by the light beam 11, the photosensitive film 16 cuts off the light beam 11 above the light detector 34. Therefore, an output signal S6 from the light detector 34 at this time has a waveform as shown in FIG. 2 at (2) on a lefthand side thereof. The output signal S6 from the light detector 34 and the beam command signal S5 are applied to a scanning period detector circuit 35. The scanning period detector 35 comprises, for example, an OR gate receptive of the signals S5, S6, and a retriggerable one-shot multivibrator for receiving an output signal from the OR gate. The multivibrator issues an output signal S7 which, as shown in FIG. 2 at (3) on a lefthand side thereof, has a positive-going edge in synchronism with the positive-going edge of the beam command signal S5 and a negative-going edge upon elapse of a prescribed period of time after the pulsed output signal S6 from the light detector 34 ceases to be generated. The signal S7 is applied to the modulating circuit 19 as a signal indicating that the leading end 16F of the photosensitive film 16 has passed through the position where the light beam 11 is applied. When the modulating circuit 19 receives the signal S7, the modulating circuit 19 controls the light modulator 20 to start modulating the light beam 11, after which the image represented by the image signal S1 is recorded on the photosensitive film 16 as described above.

When the process of recording the image is completed, the photosensitive film 16 is fed forwardly of the position where the light beam 11 is applied. Since, however, the beam command signal S5 is continuously produced a prescribed period of time after the scanning of the photosensitive film 16 with the light beam 11 has been finished, the light detector 34 detects the light beam 11 several times which has passed through the endless belt 18. The beam command signal S5 and the output signal S6 from the light detector 34 therefore have waveforms indicated in FIG. 2 at (1) and (2) on a righthand side thereof. The retriggerable one-shot multivibrator of the scanning period detector circuit 35 then produces an output signal S7 which, as shown in FIG. 2 at (3) on a righthand side thereof, has a positive-going edge in synchronism with the positive-going edge of a first pulse of the pulsed output signal S6 from the light detector 34 and a negative-going edge upon elapse of a prescribed period of time after the negative-going edge of the beam command signal S5. Thus, the output signal S7 produced at this time serves as a signal indicating that the trailing end 16R of the photosensitive film 16 has passed through the position where the light beam 11 is applied. The scanning period detector circuit 35 processes the output signal S7 from the retriggerable one-shot multivibrator to produce an output signal S8 (shown in FIG. 2 at (4)) which goes high between the two high-level portions of the output signals S7. The signal S8 therefore indicates that the photosensitive film 16 is effectively scanned by the light beam 11.

The signal S8 is supplied to an auxiliary scanning speed measuring circuit 36 which is also supplied with the line clock signal S12 that is generated in synchronism with the main scanning by the light beam 11. The auxiliary scanning speed measuring circuit 36 counts the pulses of the line clock signal 12, used as a reference clock signal, while the signal S8 remains high. An output signal S9 from the auxiliary scanning clock signal S12, indicative of the count, is then applied to an auxiliary scanning speed determining circuit 37 which compares the signal S9 with a predetermined auxiliary scanning speed signal S13 to determine whether the auxiliary scanning speed, i.e., the speed at which the photosensitive film 16 is fed, is the same as a predetermined speed or not. If the auxiliary scanning speed is the same as the predetermined speed, then the auxiliary scanning speed determining circuit 37 controls a display unit (not shown) to display "OK". If not, then the display unit displays "NG".

In this manner, it can be confirmed whether or not the auxiliary scanning speed and the main scanning speed are at a predetermined ratio and the ratio of vertical and horizontal lengths of the image recorded on the photosensitive film 16 is constant.

Figure 3:
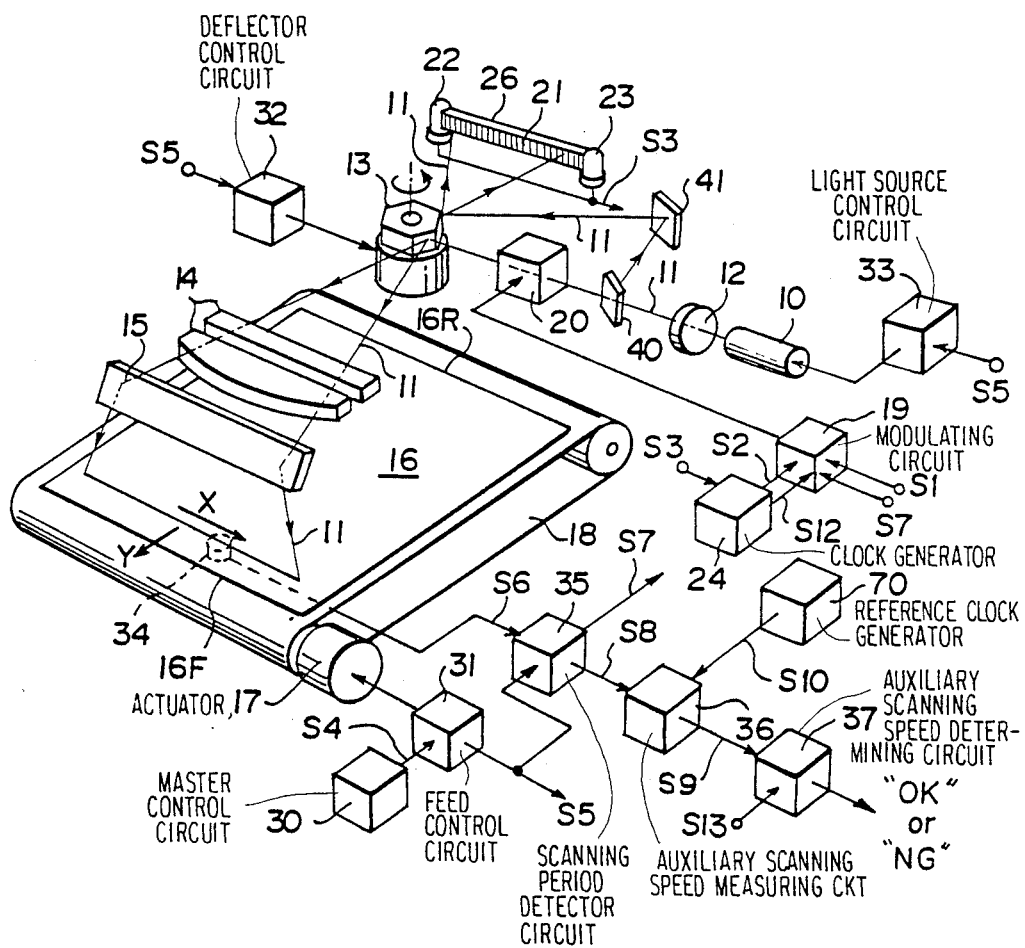
FIG. 3 is a schematic perspective view of a light scanning recording device according to a second embodiment of the present invention.

FIG. 3 shows a light scanning recording device in accordance with a second embodiment of the present invention. Those parts shown in FIG. 3 which are identical or correspond to those of the first embodiment are denoted by identical reference characters, and will not be described unless particularly required. The light scanning recording device of the second embodiment additionally includes a reference clock generator 70 for producing a reference clock signal S10 which is applied to the auxiliary scanning speed measuring circuit 36. The auxiliary scanning speed measuring circuit 36 counts the pulses of the reference clock signal S10 while the signal S8 remains high. An output signal S9 from the auxiliary scanning clock signal S12, indicative of the count, is then applied to the auxiliary scanning speed determining circuit 37 which compares the signal S9 with the predetermined auxiliary scanning speed signal S13 to determine whether the auxiliary scanning speed, i.e., the speed at which the photosensitive film 16 is fed, is the same as a predetermined speed or not. Dependent on the result of comparison, the auxiliary scanning speed determining circuit 37 controls the display unit to display "OK" or "NG".

Rather than applying the signal S9 to the auxiliary scanning speed determining circuit 37 to determine whether the auxiliary scanning speed is the same as the predetermined speed, the signal S9 may be fed back to the feed control circuit 31 to keep the auxiliary scanning speed equal to the predetermined speed through a feedback control loop. Alternatively, the detected auxiliary scanning speed may be displayed on a display unit in order that the operator can manually correct the auxiliary scanning speed should it differ from the predetermined speed.

With the light scanning recording device of the present invention, as described above, since the auxiliary scanning speed is monitored, any undesired deviation thereof from a desired speed can be corrected automatically or manually, and hence an image having an incorrect ratio of vertical and horizontal image lengths is prevented from being recorded and also the time required to record an image is prevented from being varied.

Although certain preferred embodiments have been shown and described, it should be understood that many changes and modifications may be made therein without departing from the scope of the appended claims.

We claim:

1. A light scanning recording device for recording an image on a recording medium, comprising:
    (i) a light source for emitting a light beam modulated by an image signal representing the image;
    (ii) a light deflector for deflecting the modulated light beam to scan the recording medium in a main scanning direction;
    (iii) feed means for feeding the recording medium through a feed path in an auxiliary scanning direction transverse to said main scanning direction to record the image two-dimensionally on the recording medium;
    (iv) control means for controlling said light source and said light deflector to deflect the light beam during intervals before and after the recording medium is scanned by the modulated light beam;
    (v) a light detector for detecting the light beam deflected during said intervals across said feed path;
    (vi) scanning period detecting means for detecting a scanning period in which the recording medium is scanned by the modulated light beam, based on a change in an output signal from said light detector due to the presence of the recording medium in said feed path between said light detector and said light deflector; and
    (vii) auxiliary scanning speed measuring means for measuring the speed at which the recording medium is fed through said feed path in said auxiliary scanning direction by counting pules of a reference clock signal during the scanning period which is detected by said scanning period detecting means.

2. A light scanning recording device according to claim 1, further comprising means for generating a line clock signal each time the light beam scans one scanning line in the main scanning direction, said line clock signal being used as said reference clock signal.

3. A light scanning recording device according to claim 1, further comprising a clock generator for generating a clock signal of a prescribed cyclic period, said clock signal being used as said reference clock signal.

* * * * *